2 Sheets--Sheet 1.

BATE & PINKHAM.

Improvement in Fire-Extinguishers.

No. 5,021. Reissued Aug. 6, 1872.

Witnesses.

Herbert S. Whitman
W. J. Cambridge.

Inventors.

Wallace H. Bates
George F. Pinkham
By their Attorneys
Teschemacher & Bleanis

2 Sheets--Sheet 2.

BATE & PINKHAM.

Improvement in Fire-Extinguishers.

No. 5,021.

Reissued Aug. 6, 1872.

Witnesses.
Herbert S. Whitman.
W. J. Cambridge.

Inventors
Wallace H. Bates
George F. Pinkham
By their attorneys
Teschemacher & Bearns.

BEST AVAILABLE COPY

UNITED STATES PATENT OFFICE.

WALLACE H. BATE, OF MEDFORD, AND GEORGE F. PINKHAM, OF CAMBRIDGE, MASSACHUSETTS.

IMPROVEMENT IN FIRE-EXTINGUISHERS.

Specification forming part of Letters Patent No. 88,359, dated March 30, 1869; reissue No. 5,021, dated August 6, 1872.

SPECIFICATION.

*To all whom it may concern:*

Be it known that we, WALLACE H. BATE, of Medford, in the county of Middlesex and State of Massachusetts, and GEORGE F. PINKHAM, of Cambridge, in the county and State aforesaid, have invented certain new and useful Improvements in Fire-Extinguishers, of which the following is a full, clear, and exact description, reference being had to the accompanying drawing making a part of this specification, in which—

Figure 1:
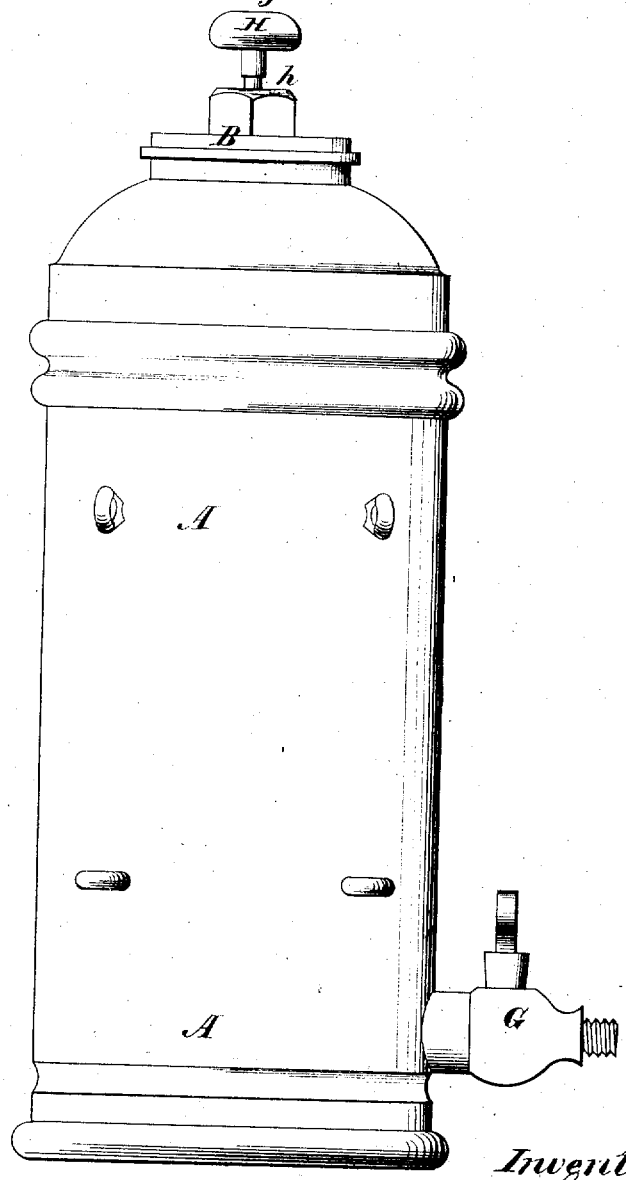
Figure 2:
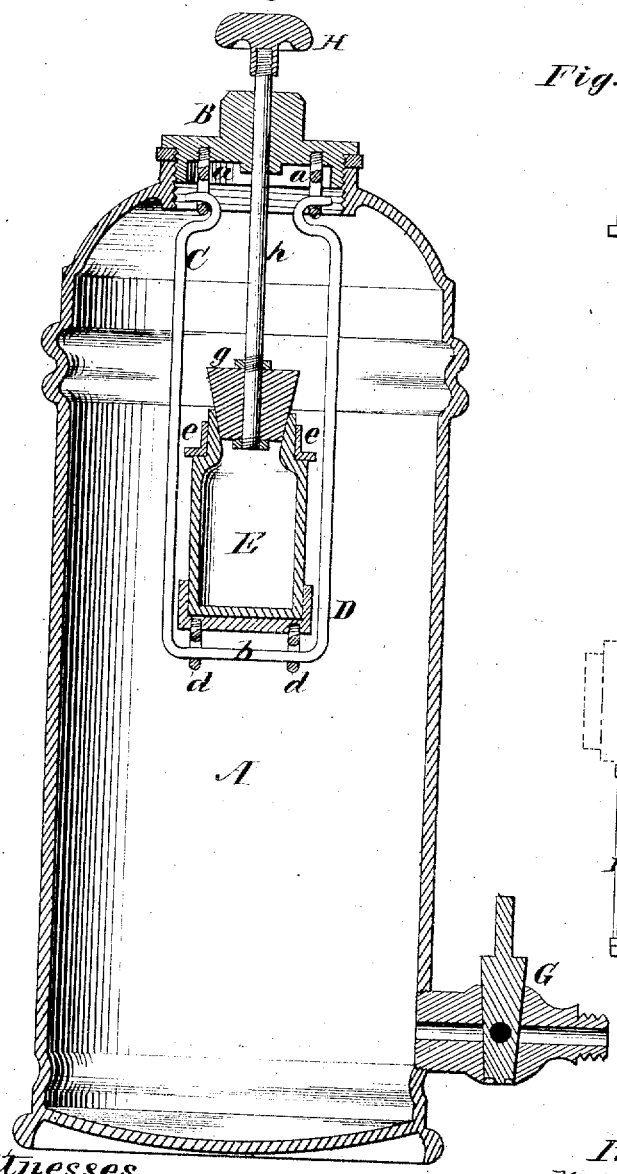
Figure 3:
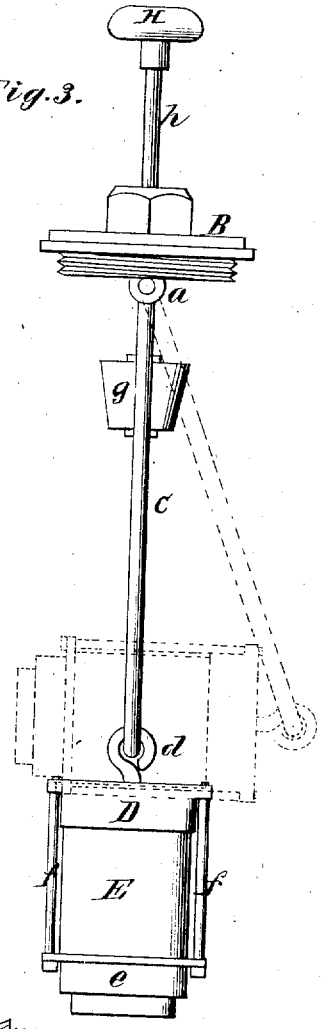

Figure 1 is a side elevation of our improved fire-extinguisher. Fig. 2 is a vertical section through the center of the same; Fig. 3, detail to be referred to.

It is well known that in the apparatus for applying carbonic-acid gas mechanically mixed with water to the extinguishment of fires, known as the fire-extinguisher, as heretofore constructed, the acid and alkali, from which carbonic-acid gas is produced, are introduced and mingled with each other when the machine is charged, thus causing the evolution of the gas almost instantaneously. In this condition the apparatus stands until wanted for use, the gas in the mean time producing great and dangerous pressure upon the machine, causing leakage, and the acid and alkali corroding and weakening it. To obviate these serious objections to the fire-extinguisher is the purpose of our improvement. It relates to a device whereby the acid and alkali may be kept separate from each other until the apparatus is required to be brought into use.

As one method of carrying our invention into practice, we make use of a closed receptacle for containing one of the gas-generating ingredients, and arrange the same within the main reservoir or receptacle, also closed, charged with the other gas-generating ingredient, so arranged that it may be readily turned over therein by means of suitable mechanism operated from the outside of the apparatus, when it is desired to bring the acid and alkali into contact with each other for the purpose of generating carbonic-acid gas.

To enable others skilled in the art to understand and use our invention, we will describe the manner in which we have carried it out.

In the said drawing, A represents a cylindrical vessel or reservoir, formed of copper or other suitable material, of sufficient thickness to withstand the internal pressure to which it is required to be subjected. This receptacle A is intended to be entirely or partially filled with a suitable alkaline solution, (we prefer water and bi-carbonate of soda,) the mouth or opening at the top of the reservoir A being tightly closed by a screw-cap, B. To the under side of the cap B are secured two eyes, *a*, for the reception of the hooks at the upper extremity of a wire frame, C, the bottom of which extends down within the receptacle A sufficiently far to allow space for the receptacle E to turn freely therein. The horizontal portion *b* of the frame *c* passes through the two eyes *d*, projecting from the bottom of a metallic socket, D, in which is secured a receptacle, E, of glass or other suitable material for containing sulphuric or other suitable acid, the upper portion of this receptacle being protected by a metallic collar, *e*, held in place by rods *f* connected with the socket D. The mouth of the receptacle E is closed by a stopper, *g*, which is secured to the lower end of a rod, *h*, which slides through a stuffing-box in the cap B, and is provided with a knob, H, at its upper end. When the stopper is in place, the receptacle E will be supported within the frame C in the position seen in Fig. 2, and the acid and alkali will then be kept entirely separate from each other, so that the apparatus may be subjected to rough handling during transportation, or even turned bottom side up, without any liability of the gas-generating ingredients coming into contact with each other, thus entirely avoiding the leakage which has heretofore been liable to occur on account of the constant pressure within the apparatus, and which has, in very many instances, rendered these machines worthless in time of need. When, however, the apparatus is required to be brought into use, the stopper *g* is withdrawn by taking hold of the knob H and raising the rod *h*, which leaves the upper end of the receptacle unsupported, when it will turn over by its own gravity and assume the position seen in Fig. 3, allowing the acid which it contains to escape freely and mingle with the alkaline solution contained in the main reservoir A for the purpose of generating the carbonic-acid gas as required. G is the stop-cock by which the liquid contained in the vessel A is ejected in a flexible pipe, (not shown,) and thence onto the fire in the ordinary manner. By pivoting the upper end of the frame C to the cap B, so that it may be vibrated to either side, the length of the receptacle E may be made nearly equal to the inside diameter of the vessel A, the frame being forced out to one side by the turning over of the receptacle, as seen in Fig. 3, and we are thus enabled to employ a receptacle, E, of greater length than would be practicable were the frame C attached rigidly to the cap B, and consequently the diameter of the opening at the top of the main reservoir, and the size of the cap B and parts connected therewith are reduced thereby, increasing their strenth and reducing their cost.

The above-described device is cheap, simple, and reliable, and by its use a fluid acid (which is cheap and instantaneously mixes with the alkali) may be advantageously employed, as there is no liability of its coming in contact with alkaline solution during transportation or rough handling; and by placing the stopper *g* at the top of the receptacle E, and so arranging the latter within the main reservoir A that it may be overturned therein to discharge its contents, instead of providing the receptacle with a valve at its bottom, operated by a rod extending through the acid, all liability of the working parts being corroded and injured is avoided, as the acid does not come into contact therewith.

We do not confine ourselves to the particular method above described of supporting the receptacle E, as it is evident that it may be supported in some other manner so as to admit of its being overturned within the reservoir A, and its contents discharged by mechanism operated from the outside of the apparatus; nor do we confine ourselves to any particular method of discharging the contents of the receptacle E into the main reservoir A. Any obvious mechanical means may be adopted without departing from the spirit of our invention With the receptacle E closed by means of a stopper or cover or other known method, it allows the apparatus to be transported and roughly handled without any liability of the acid and alkali coming into contact with each other, which is the main idea or principle of our invention. Such contact would be likely to occur were the top of the receptacle E left open.

It is obvious that other methods than the one we have above described may be adopted for keeping the acid and alkali separate, but in such relation with each other as to be immediately brought in contact when the apparatus is wanted for use, and still be within the principle and scope of our invention.

What we claim as our improvement in the fire-extinguisher, and desire to secure by Letters Patent, is—

1. The closed receptacle E, made of glass, placed within the reservoir A to be discharged of its contents in the manner herein set forth, or by other effective means.

2. An open or closed receptacle for containing one of the gas-generating ingredients, when so arranged that it may be turned over within the main reservoir by means of suitable mechanism operated from the outside of the apparatus to bring the acid and alkali into contact with each other to generate carbonic-acid gas, as set forth.

3. The receptacle E, so hung or supported in a frame, C, attached to the cap B that it may turn over within the reservoir A on the withdrawal of the stopper *g*, substantially in the manner and for the purpose described.

4. A frame, C, pivoted to the cap B so as to allow the receptacle E to turn over within the reservoir A, substantially as and for the purpose set forth.

WALLACE H. BATE.
GEO. F. PINKHAM.

Witnesses:
EDMUND BURKE,
L. W. LOVELL.